(No Model.) 2 Sheets—Sheet 2.

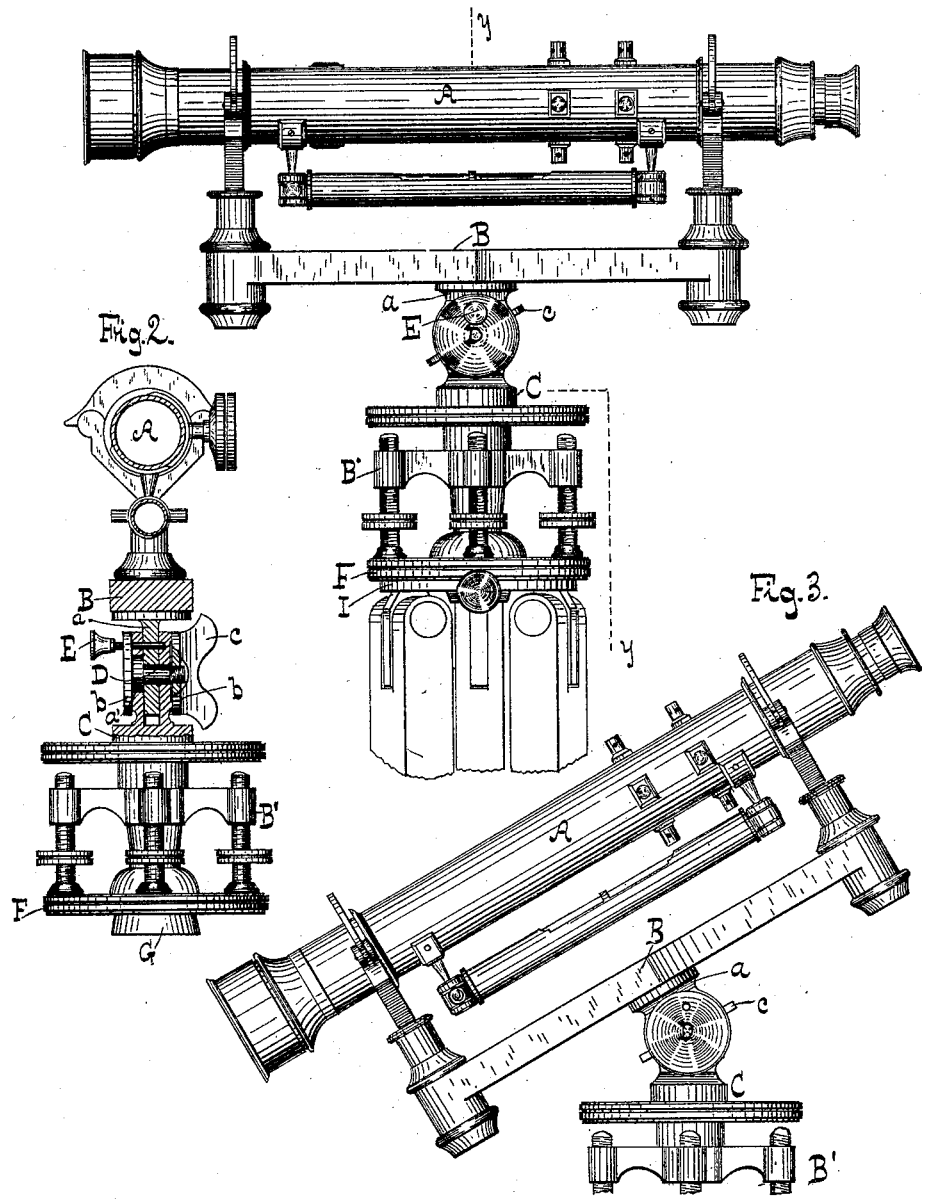

E. G. SOLTMANN & H. E. GRABAU.
LEVELING INSTRUMENT.

No. 446,956. Patented Feb. 24, 1891.

WITNESSES:
L. N. Legendre
A. Faber du Faur

INVENTORS
Edward G. Soltmann
Hans Edgar Grabau
BY A. Faber du Faur Jr.
Their ATTORNEY

UNITED STATES PATENT OFFICE.

EDWARD G. SOLTMANN, OF NEW YORK, N. Y., AND HANS EDGAR GRABAU, OF HOBOKEN, NEW JERSEY.

LEVELING-INSTRUMENT.

SPECIFICATION forming part of Letters Patent No. 446,956, dated February 24, 1891.

Application filed June 6, 1890. Serial No. 354,452. (No model.)

*To all whom it may concern:*

Be it known that we, EDWARD G. SOLTMANN, a citizen of the United States, and resident of New York, in the county and State of New York, and HANS EDGAR GRABAU, a citizen of the German Empire, and a resident of Hoboken, in the county of Hudson and State of New Jersey, have invented certain new and useful Improvements in Surveying-Instruments, of which the following is a specification.

Our invention has reference to improvements in surveying-instruments, and especially to engineers', architects', and builders' levels; and it has for its objects to provide means, at a slight cost, whereby the telescope can be readily depressed or elevated, and also to provide simple means whereby the instrument proper can be quickly applied to or removed from the stand or tripod.

With these objects in view our invention consists, first, in a surveying-instrument having its leveling-bar connected with the leveling-head by a hinged joint permitting the free movement of the telescope by hand about said hinge as a pivot, and, secondly, in a device for securing the instrument to the stand or tripod, consisting of a conical hub, a conical socket formed in the tripod-head, and a fastening device engaging with the wall of the hub for pressing the same against the wall of the socket, all of which is more fully pointed out in the following specification and claims and illustrated in the accompanying drawings, in which—

Figure 4:
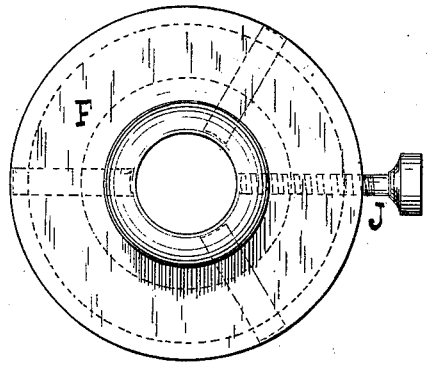
Figure 7:
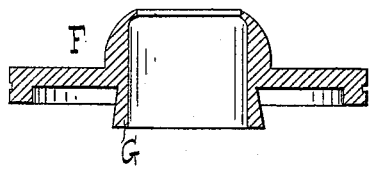
Figure 5:
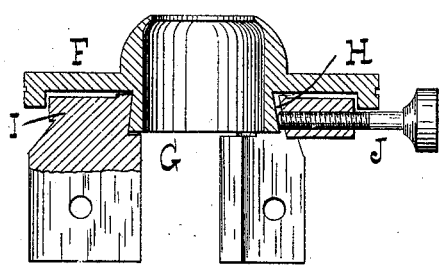
Figure 8:
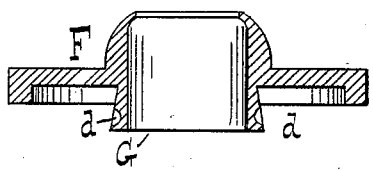
Figure 6:
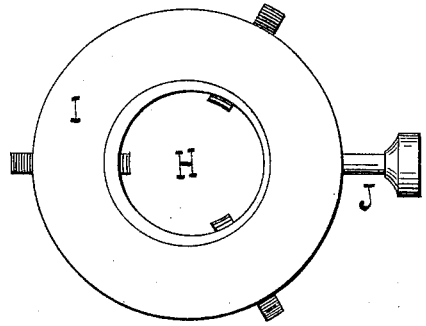
Figure 9:
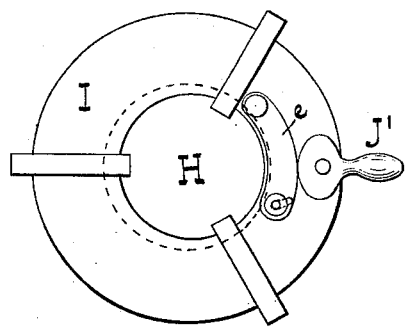

Figure 1 represents a side elevation of a builders' or architects' level constructed according to our invention. Fig. 2 is a vertical section in the plane $y\ y$, Fig. 1. Fig. 3 is a view similar to Fig. 1, but showing the telescope depressed. Figs. 4, 5, 6, and 7 are detail views, on a larger scale than the preceding figures, illustrating the construction of the devices for clamping the instrument proper to the stand or tripod. Figs. 8 and 9 represent modifications of the devices illustrated in Figs. 4, 5, 6, and 7.

Similar letters indicate corresponding parts.

In the drawings, referring at present to Figs. 1, 2, and 3, the letter A designates the telescope mounted in suitable Y's secured to the leveling-bar B, all as usual in leveling-instruments. On the lower side of the leveling-bar is formed a vertical lug or ear $a$, which is received between two lugs or ears $b$ $b$, Fig. 2, projecting upwardly from the vertical center C of the instrument. These lugs or ears are united by means of a bolt, as D, passing transversely through the same and forming a horizontal center between the leveling-bar and the leveling-head B', about which the telescope can be depressed or elevated. The head of the bolt is provided with a shoulder $a'$, which passes through one of the lugs or ears $b$ and bears upon the lug or ear $a$. The threaded end of the bolt is engaged by a thumb-screw $c$, so that by screwing up on the latter sufficient friction can be produced to hold the telescope at any angle it may be set to. A pin E, passing through suitable holes in the ears or lugs $a$ and $b\ b$, serves to hold the telescope at right angles to the vertical center C of the instrument.

To secure the instrument proper to the stand or tripod we make use of the following means: The lower plate F of the leveling-head B' is provided with a downwardly-projecting conical hub G, which is adapted to enter a corresponding conical opening or socket H formed in the cap I of the stand or tripod. This opening or socket is larger in diameter than the hub, so that the latter can be readily inserted or removed. A screw J, passing through the cap I, when screwed up forces the hub against the opposite side of the socket, and the former, by virtue of the conical faces, is drawn well into the socket, whereby the instrument is held firmly to the cap of the tripod. The socket H is bored out eccentric with respect to the center of the cap, which brings the vertical center of the instrument in line with the center of the cap. The hub G may be provided with a circumferential groove $d$, Fig. 8, which receives the end of the screw J, this construction preventing the conical face of the hub from being marred or indented by the screw.

In place of the screw, any other suitable means may be employed for pressing the hub against the wall of the socket. For instance, as shown in Fig. 9, a link or jaw $e$ and cam or eccentric J' may be used.

What we claim as new, and desire to secure by Letters Patent, is—

1. A surveying-instrument having its leveling-bar connected with the leveling-head by a hinged joint permitting the free movement of the telescope, in combination with a thumb-screw or equivalent device applied to the joint for retaining the telescope at the desired angle, and means for holding the telescope at right angles to the vertical center of the instrument, substantially as described.

2. A surveying-instrument having a hinged connection between the leveling-bar and the leveling-head, and a pin adapted to pass through the parts of the hinge to hold the telescope at right angles to the vertical center of the instrument, substantially as described.

3. In a surveying-instrument, a device for securing the instrument to the stand or tripod, consisting of a conical hub, a conical socket formed in the tripod-head, and a fastening device engaging with the wall of the hub for pressing the same against the wall of the socket, substantially as described.

4. In a surveying-instrument, a device for securing the instrument to the stand or tripod, consisting of a conical hub provided with a circumferential groove, a conical socket formed in the tripod-head, and a fastening device engaging with the grooved portion of the hub, substantially as and for the purpose set forth.

5. In a surveying-instrument, a device for securing the instrument to the stand or tripod, consisting of a conical hub, an eccentric conical socket formed in the tripod-head, and a fastening device engaging the wall of the hub, substantially as and for the purpose set forth.

In testimony that we claim the foregoing as our invention we have signed our names, in presence of two witnesses, this 5th day of June, 1890.

EDWARD G. SOLTMANN.
HANS EDGAR GRABAU.

Witnesses:
A. FABER DU FAUR,
L. N. LEGENDRE.